…

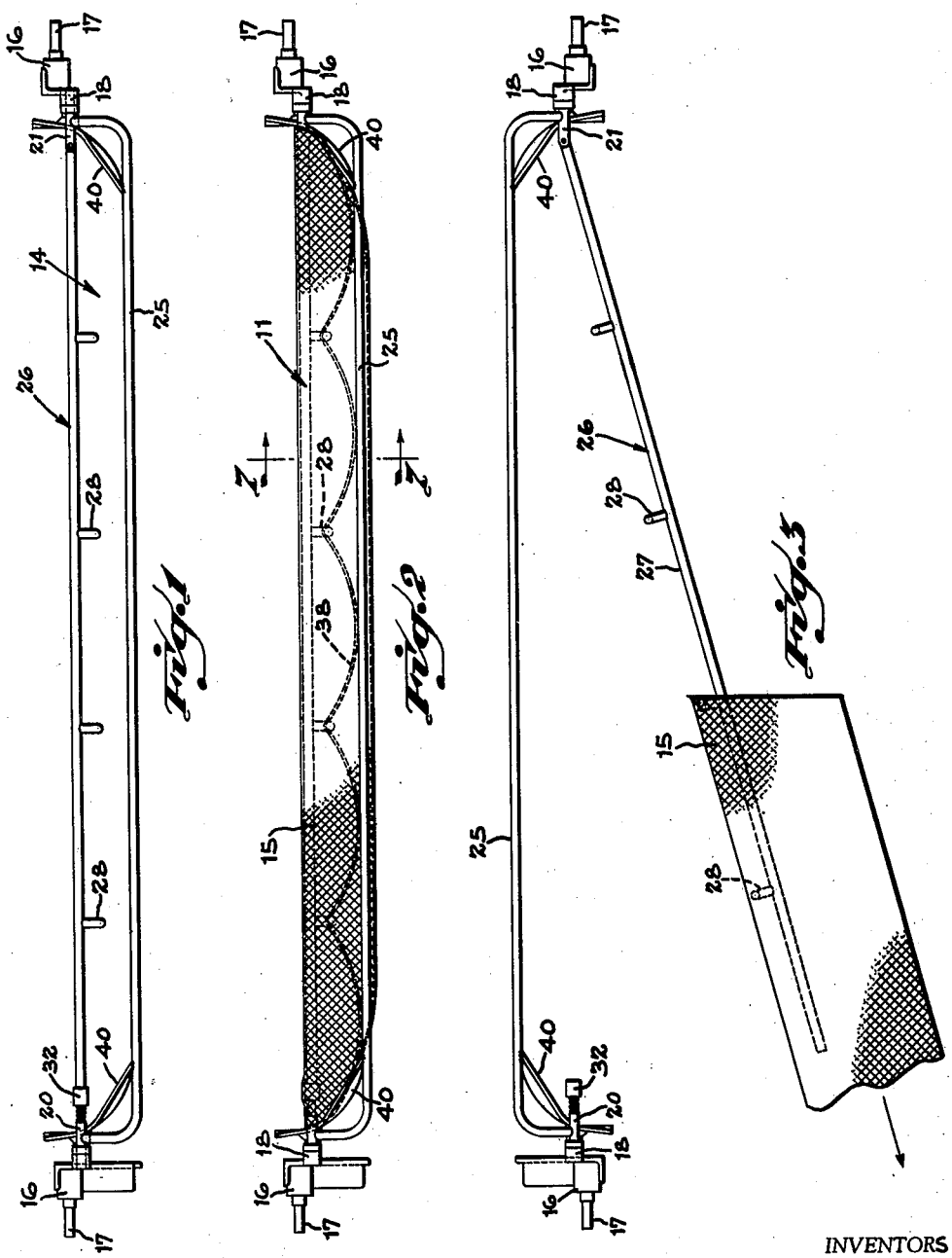
June 2, 1953  C. R. RECHTIN ET AL  2,640,583
PROOFER TRAY
Filed Jan. 11, 1951  2 Sheets-Sheet 1
INVENTORS
Clarence R. Rechtin.
William P. Bruestle.
BY Wood, Arey, Herron & Evans.
ATTORNEYS.

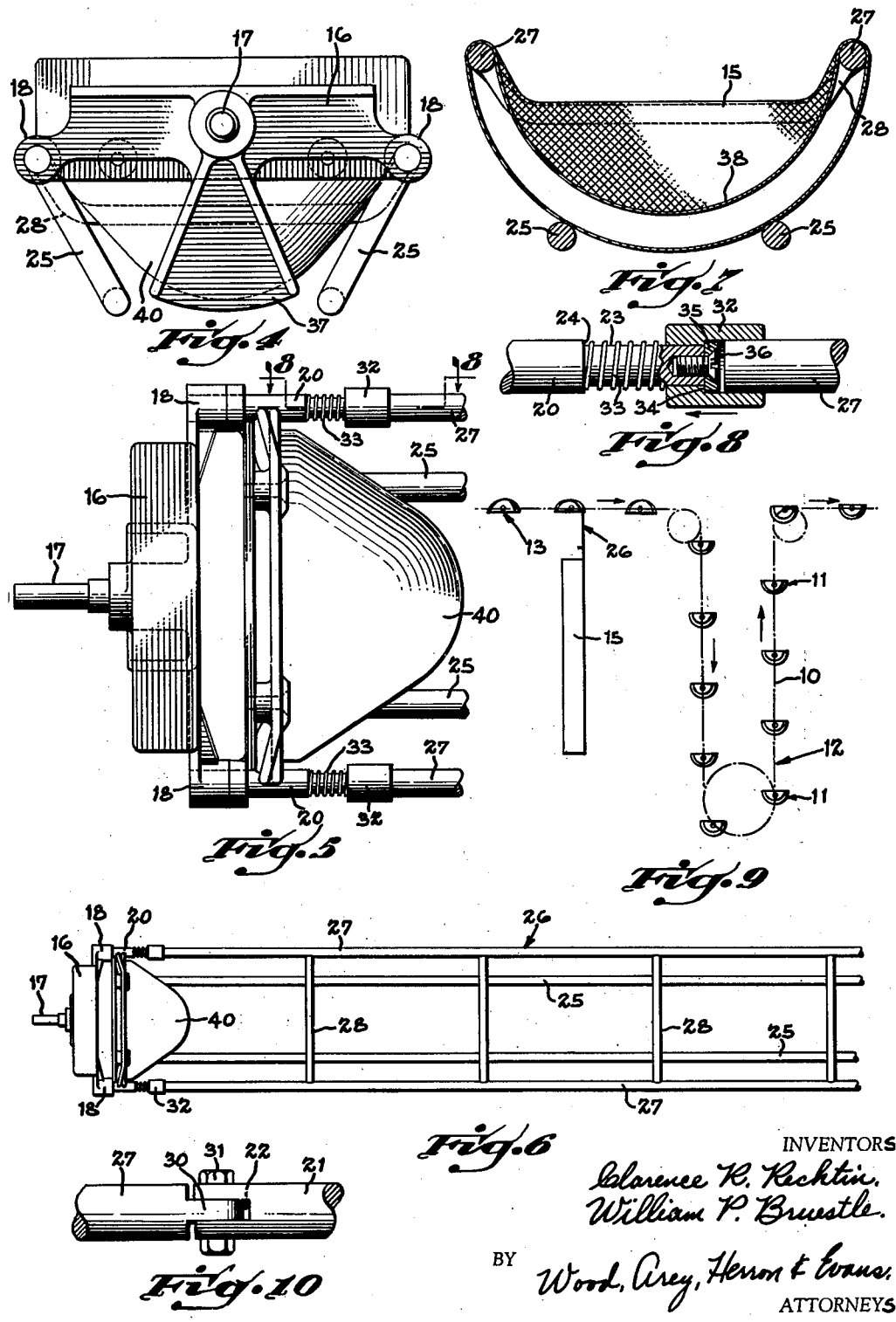

UNITED STATES PATENT OFFICE 2,640,583

PROOFER TRAY

Clarence R. Rechtin and William P. Bruestle, Cincinnati, Ohio, assignors to The J. H. Day Company, Inc., Cincinnati, Ohio, a corporation of Ohio Application January 11, 1951, Serial No. 205,544

5 Claims. (Cl. 198—152)

This invention relates to equipment for baking bread and is particularly directed to a novel proofer tray of the type used to carry lumps of dough through a proofing chamber in which the dough is conditioned prior to sheeting and curling.

A proofer tray of the type to which this invention relates comprises an elongated frame assembly over which a removable fabric sleeve is disposed. The frame assembly includes spacing members, which support the sleeve so that it forms a plurality of dough carrying pockets, and means for pivotally mounting each end of the tray upon a chain conveyor.

A large proofer may include several hundred such trays which are moved on a pair of endless chain conveyors along a circuitous path through the proofing chamber. Lumps of dough are fed to the proofer through a distributing mechanism, from a belt conveyor which receives them as they are discharged from a rounder. The distributing mechanism transfers the lumps from the conveyor to the trays in a uniformly spaced relationship so that a single lump is disposed within each tray pocket. During the travel of the dough lumps through the proofer, the dough cells are given a chance to recuperate from the rough handling encountered in the divider and rounder. In addition to the cell growth which takes place during the proofing operation, a smooth, silky skin is formed upon the loaf. After the dough pieces have passed through the proofing chamber, they are discharged onto a second conveyor from which they are fed to the sheeting rolls of the molder.

It has been found advantageous in proofer construction to form the trays, for conveying the dough lumps, from a frame assembly carrying a flexible sheeting material covering, such as canvas, in order to provide proper aeration of the dough lumps. A canvas tray is also preferable because it eliminates the condensation which tends to collect on a metal tray and which causes sticking and retards proper skin formation. A canvas tray permits the entire surface of the dough lumps to be exposed to the air, and further reduces the tendency for moisture to accumulate under the dough lumps since any moisture left in the bottom of the pocket is disbursed throughout the pocket. As a result, a fine skin is formed upon the dough lumps and their tendency to stick to the tray is considerably lessened.

However, a proofer having several hundred canvas covered trays presents a considerable sanitation problem, since the dough is often passed through the proofer in a relatively slack condition and tends to adhere to the canvas sleeves and exposed parts of the frames necessitating their being cleaned at frequent intervals. The problem is aggravated by the fact that the proofer must be shut down while the sleeves are being cleaned, which entails closing down the entire production line depending upon the operation of the proofer including, the mixer, divider, rounder and molder.

In order to minimize the non-productive, shut down time of these machines, it is highly desirable to provide a proofer tray which may be quickly cleaned. One method of cleaning which is available consists of brushing the canvas sleeves with a stiff brush, as the proofer is run without dough for a complete cycle. Eventually, however, even with regular brushing the sleeves become unsanitary and it is necessary to remove them from the proofer and launder them. Moreover, the sanitation codes now enforced in many localities include stringent provisions as to the thoroughness and frequency of cleaning which is required. As a result, it has become very important that the proofer trays not only be accessible for brushing, but also that the sleeves be readily removable for laundering purposes.

The present invention is predicated upon the concept of providing in a proofer tray a hinged sleeve carrying member which may be disposed in a lump carrying position, in which the sleeve is supported in a pocketed configuration, or in a cleaning position in which the sleeve may easily be removed. More specifically, the present invention contemplates a proofer tray frame having a sleeve carrying drop member which is hinged at one end so that when the tray is inverted during its travel through the lower part of the proofing chamber after passing the lump discharge station, the drop member may be swung downwardly permitting the sleeve to be slipped off and another slipped on in its place.

The principal advantage secured from constructing a proofer in accordance with our invention is the speed with which the entire set of sleeves may be replaced.

In the preferred method of changing sleeves, the proofer is run through a complete cycle without any dough lumps being fed to it. A pair of operators are stationed on opposite sides of the proofer at a cleaning bay beyond the discharge station at which time the trays are in an inverted position before their vertical travel downwardly from the proofing chamber to the loading station. As each tray, during its horizontal travel away from the discharge station, reaches a position over the cleaning bay, the conveyor is stopped. The first operator then grasps the hinge member of the inverted tray and swings it downwardly until it is grasped by the second operator who pulls the soiled sleeve free and slips a clean one over the frame. Then the tray is swung upwardly and is re-secured to the end member by the first operator. The conveyor is then jogged until the next set of trays are positioned over the bay and the procedure is repeated until each of the sleeves has been replaced. In this manner, the operators can change several sleeves a minute and the entire proofer may be cleaned in a minimum amount of time.

A further advantage of the present invention is the elimination of any creases or wrinkles in the sleeve in which dough and dirt could become trapped.

Another advantage of the present invention resides in the simplicity of the frame assembly and the ease with which it may be wiped free of any adhering dough at the same time that the sleeves are being changed.

These and other objects and advantages will be apparent from a consideration of the specification in conjunction with the drawings in which:

Figure 1 is a side elevational view of the proofer tray frame.

Figure 2 is a side elevational view of the proofer tray frame showing the sleeve placed over the drop member.

Figure 3 is a side elevational view of the frame in the inverted position with the hinged drop member partially lowered and the sleeve partially removed.

Figure 4 is an end view of the frame.

Figure 5 is a partial top view of one end of the frame showing the baffle plate and spring urged sleeves.

Figure 6 is a fragmentary top view of the frame.

Figure 7 is a cross-sectional view taken along line 7—7 of Figure 2.

Figure 8 is a cross-sectional view taken along line 8—8 of Figure 5.

Figure 9 is a partial diagrammatic view of a proofer showing the position of the trays when the sleeves are changed.

Figure 10 is a partial top elevational view showing the drop member hinge construction.

As shown diagrammatically in Figure 9, a pair of spaced parallel chains 10 carry a series of trays 11, each of which is adapted to receive a plurality of dough lumps, over a circuitous path through a proofing chamber. The trays 11 are loaded by a transfer mechanism, not shown, and move upwardly from the loading station, indicated generally at 12, into the proofing chamber which is also not shown. After passing through the chamber, the trays move downwardly until they reach the discharge position shown generally at 13 where the trays are inverted by a trip mechanism so that the dough lumps may be discharged from the trays onto a discharge conveyor. The trays remain in the inverted position until they begin their downward travel to the loading station.

When the proofer is to be cleaned, it is run intermittently without any dough lumps being fed to it. As each tray reaches the inverted position over a bay located between the discharge station and the point at which the trays begin their downward travel, the conveyor is stopped and the soiled sleeve is removed from the tray and replaced with a clean one.

The trays 11 comprise generally a frame assembly 14 and a flexible sleeve 15 which slides over a portion of the frame assembly, and is supported in a pocketed configuration, adapted to receive a plurality of lumps of dough. It has been found preferable to construct the sleeve of a flexible sheet material such as canvas so that, as had previously been pointed out, the dough lumps will be properly aerated. The actual sleeve construction constitutes no part of the present invention, however, as the frame herein disclosed is adapted to cooperate with a variety of removable sleeves.

As shown in Figure 1, the frame assembly 14 includes two end members 16, each of which is provided with an outwardly extending stud 17 adapted to ride in one of a plurality of chain rollers, provided in the chain reaches 10, so that the trays may be pivotally mounted on the chain conveyor. Each end member 16 is further provided with two dog ears 18 which carry short end bars 20 and 21. The end bars 21 secured to one end member are provided with a slot 22 and a pin receiving aperture extending at right angles to the slot. The end bars 20 secured to the opposite end member have cylindrical extensions 23 of reduced diameter forming annular shoulders 24. Each of the support rods 25 is joined, as by welding, to a pair of end rods 20 and 21 associated with opposite end members, thus rigidly securing the two end members 16 in a spaced parallel relationship.

The sleeve carrying drop member 26 comprises a pair of drop rods 27 and a plurality of parallel spacing bars 28 which cause the pocketed configuration of the sleeve 15. The spacing bars 28, shaped to resembled shallow U's, are joined at intervals to the two drop rods 27. As shown in Figures 3 and 10, the drop rods 27 are hingedly mounted to the slotted end bars 21. The pivotal mounting is effected by inserting a tongue 30 provided on the drop rod into the slot 22 and then passing a pivot pin 31 through the pin receiving apertures in the end rod and tongue.

A collar 32 is slidably mounted upon the extension 23 provided on each of the end rods 20. Each collar 32 is configurated internally to form two cylinders of different diameters, one corresponding to the extension diameter, the other, to the drop rod diameter. Additionally, a spring 33 is placed over the extension 23 so that one of the spring ends abuts the shoulder 24, and the other abuts the collar 32, urging it outwardly. The collar 32 is prevented from sliding completely off the extension 23 by the abutment of the shoulder 34, formed by the junction of the two internal cylinders, with a retaining washer 35 which is secured to the extension by a bolt 36 or some similar means.

The collars 32 serve as a means for selectively securing the drop member 26 in the normal lump carrying position. Since the end bars 20, 21 associated with opposite end members 16 are aligned with each other, the drop rods 27 can be rotated so that their ends are adjacent to and disposed co-linearly with the end bars 20. When the drop rods are so disposed, the collars 32, which must be retracted over the extensions 23 to permit the drop rods to swing into alignment with the end bars 20, are released and engage the ends of the drop rods 27 forming a rigid connection with the end bars 20.

In order to insert a canvas sleeve 15 over the drop member 26, the collars 32 are retracted over the extensions 23, and the drop member 26 is rotated so that the ends of the rods 27 swing free of the extensions 23 and end members 16. The sleeve or cylindrical stocking is then slipped over the drop rods 27 and around the spacing bars 28. After the sleeve has been pulled completely over the drop member, the member is rotated until the rods 27 are aligned with the end bars 20 at which time the collars 32 are released to lock the drop rods in place.

As the tray is moved by the chain conveyor 10 from the inverted discharge position, the depending arm 37, which is associated with one of the end members 16, is engaged by a tripping mechanism causing the proofer tray to rotate about the studs 17 into the normal up-right position. With the trays in the up-right position, one layer of the canvas sleeve 15 rests on the tray support rods 25 and another layer passes over the drop rods 27 and the spacer bars 28 to form a series of lump carrying pockets 38, each pocket coinciding with the region between adjacent spacer bars 28. The pocket formed at each end of the sleeve is closed by a scoop-like baffle plate 40 which is bolted or otherwise secured to each end member 16.

During normal operation, lumps of dough are dropped from the transfer mechanism into each pocket 38 formed in the sleeve 15. The lumps are conveyed upwardly by the chain conveyor 10 and then along a tortuous path through the proofing chamber to the lump discharge station 13 where the trays are inverted dropping the lumps of dough into a conveyor below. As the trays reach the vertical section of the proofer in returning to the loading station 12, they are again inverted to their dough receiving position.

When the proofer trays are to be cleaned and the soiled sleeves replaced with fresh ones, the proofer may be run without any dough lumps being fed to it by the transfer mechanism. As each tray passes over a cleaning bay located intermediate the discharge station and the vertical section of the proofer, the chain conveyor is stopped. An operator positioned alongside the proofer slides both sleeves 32 over the extensions 23 and rotates the drop rods 27 downwardly until they are grasped by a second operator standing on the opposite side of the proofer. The second operator removes the soiled sleeve 15 from the drop member and after discarding it, slips a fresh one in its place and then swings the drop member upwardly. The drop rods 27 are brought into alignment with the extensions 23 by the first operator who releases collars 32 to firmly secure the drop member in its dough carrying position. When the drop member has been firmly secured to the extensions, the proofer conveyor may be jogged until the succeeding trays are disposed over the cleaning bay and the process may be repeated until all of the sleeves have been changed in this manner.

It will be noted that since the proofing chamber and discharge station are usually located overhead, the ends of the drop rods remain a considerable distance above the floor even when dropped into the vertical position. As a result, the sleeves may be changed without the necessity of the fresh sleeves ever contacting the bakery floor.

While we have shown our invention in a preferred embodiment, it will be apparent to those skilled in the art that various modifications and changes may be made without departing from the scope of our invention. For example, other means, such as bayonet type connections, may be used to selectively secure the drop rods in their normal sleeve supporting position. Therefore, we desire to be limited only by the following claims.

Having described our invention, we claim:

1. A proofer tray comprising two end members, a plurality of support rods, each of said support rods being rigidly connected to each of said end members, a drop member, said drop member including a pair of drop rods, said drop rods extending intermediate said end members in parallel spaced relationship, a plurality of arcuate spacing bars, said spacing bars interconnecting said drop rods at spaced intervals, said drop bars being hingedly connected to one of said end members, means for releasably holding said drop member in a fixed position relative to the opposite end member, said means including retractable collars carried by said opposite end member and adapted for releasable telescopic engagement with the ends of said drop bars, and a flexible sleeve adapted to fit over said drop rods and spacing bars when said drop member is rotated free of said opposite end member.

2. A proofer tray comprising two end members, end bars associated with each of said end members, a plurality of support rods, each of said support rods being rigidly connected to end bars associated with each of the opposite end members, a drop member, said drop member comprising a pair of drop rods, said drop rods extending intermediate said end members in parallel spaced relationship, a plurality of arcuate spacing bars, said spacing bars interconnecting said drop rods at spaced intervals, said drop bars being hingedly connected to the end bars associated with one of said end members, means for releasably holding said drop member in a fixed position relative to the opposite end member, said means including retractable collars carried by the end bars of the opposite end member and adapted for releasable telescopic engagement with the ends of said drop bars, and a flexible sleeve adapted to fit over said drop rods and spacing bars when said drop member is rotated free of said end member.

3. A proofer tray comprising two parallel end members, end bars carried by each of said end members and extending perpendicular thereto, a plurality of support rods, each of said support rods being rigidly connected to an end rod associated with each of the opposite end members, a drop member, said drop member comprising a pair of drop rods, said drop rods extending intermediate said end members in parallel spaced relationship, said drop bars being spaced apart substantially the same distance as the end bars associated with each of said end members, a plurality of arcuate spacing bars, said spacing bars interconnecting said drop rods at spaced intervals, said drop bars being hingedly connected to the end bars associated with one of said end members, means for releasably holding said drop member in a fixed position relative to the opposite end member, said means including retractable collars carried by the end bars of the opposite end member and adapted for releasable telescopic engagement with the ends of said drop bars, spring means for urging said collars into engagement with said drop bars and a flexible sleeve adapted to fit over said drop rods and spacing bars when said drop member is rotated free of said end member.

4. A proofer tray comprising two parallel end members, a plurality of support rods extending between said end members, each of said support rods being rigidly connected to each of said end members, a drop member, said drop member including a pair of drop rods disposed intermediate the end members and extending transversely thereof, said drop member being hingedly connected to one of said end members, means for releasably securing said drop member to the opposite end member, and a flexible sleeve adapted to fit over said drop rods when the drop member is rotated free from said opposite end member.

5. A proofer tray comprising two parallel end members, a plurality of support rods extending between said end members, each of said support rods being rigidly connected to each of said end members, a drop member disposed intermediate the end members and extending transversely thereof, said drop member being hingedly connected to one of said end members, means for releasably securing said drop member to the opposite end member, and a flexible sleeve adapted to fit over said drop member when said member is rotated free from said opposite end member, said drop member being so configurated that the sleeve forms a series of pockets when in place over said drop member.

CLARENCE R. RECHTIN.
WILLIAM P. BRUESTLE.

References Cited in the file of this patent

UNITED STATES PATENTS

| Number | Name | Date |
|---|---|---|
| 1,334,024 | Embrey | Mar. 16, 1920 |
| 1,382,610 | Streich | June 21, 1921 |
| 2,104,431 | Marasso | Jan. 4, 1938 |